United States Patent [19]

Mangino, Sr.

[11] Patent Number: 5,337,487
[45] Date of Patent: Aug. 16, 1994

[54] LAYOUT TOOL

[76] Inventor: Albert R. Mangino, Sr., R. D.#1, Rte. 9, Mechanicville, N.Y. 12118

[21] Appl. No.: 37,346

[22] Filed: Mar. 26, 1993

[51] Int. Cl.$^5$ .............................. G01B 3/10; B43L 7/10
[52] U.S. Cl. ....................................... 33/760; 33/761; 33/768; 33/459; 33/499
[58] Field of Search ................. 33/759, 760, 768, 769, 33/770, 415, 416, 417, 418, 423, 456, 459, 468, 460, 461, 462, 463, 495, 498, 499, 500, 761, 755

[56] References Cited

U.S. PATENT DOCUMENTS

| | | | |
|---|---|---|---|
| 1,442,136 | 1/1923 | Eads | 33/456 |
| 2,840,914 | 7/1958 | Buckelew | 33/761 X |
| 3,008,238 | 11/1961 | Ford . | |
| 3,364,581 | 1/1968 | Andrews . | |
| 3,568,322 | 3/1971 | Showers . | |
| 4,106,201 | 8/1978 | Hansen | 33/761 X |
| 4,438,538 | 3/1984 | Larsen | 33/760 X |
| 4,700,489 | 10/1987 | Vasile | 33/342 |
| 4,920,658 | 5/1990 | Hile | 33/499 X |
| 4,965,944 | 10/1990 | Kuze et al. | 33/760 |

Primary Examiner—William A. Cuchlinski, Jr.
Assistant Examiner—Alvin Wirthlin
Attorney, Agent, or Firm—Schmeiser, Morelle & Watts

[57] ABSTRACT

A hexahedronic case (12) with a singular face extension (20) and swingout arm pair (14L, 14R) for housing a conventional, flexible measuring tape (26). A carpenter's extensible-retractable measuring tape is housed in a six-faced case which has a pair of parallel, pivotally outward swinging arms and a flange (20) extending from the rear face thereof. Several faces of the case are indexed by marks at the center (24) only of the face edges which have a consistent dimension (Z). On one face, that opposite the flange-bearing face, there is a set of indices (22) which equally divide an edge of the face upon which they appear. The divisions, in respect of the aforementioned consistent dimension, correspond to various pitches or elevations above the horizontal, or angular deflections from the vertical, that are employed in layout work in the building construction field. An example of layout for roof rafter (40) preparation is also presented.

12 Claims, 3 Drawing Sheets

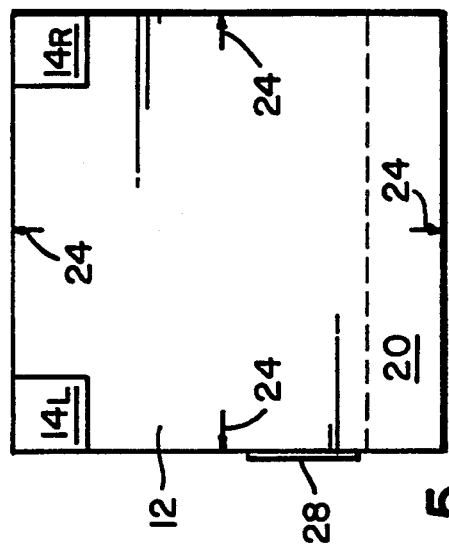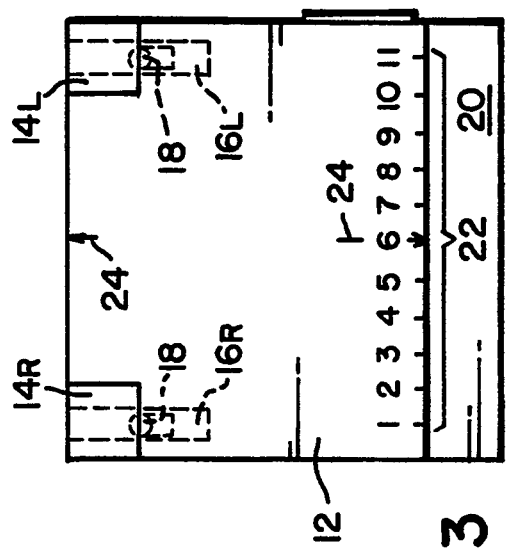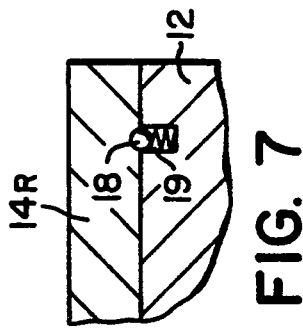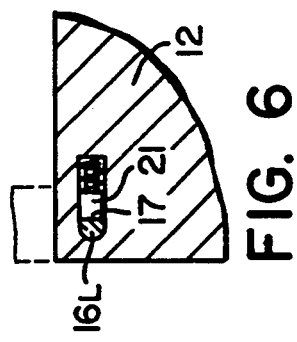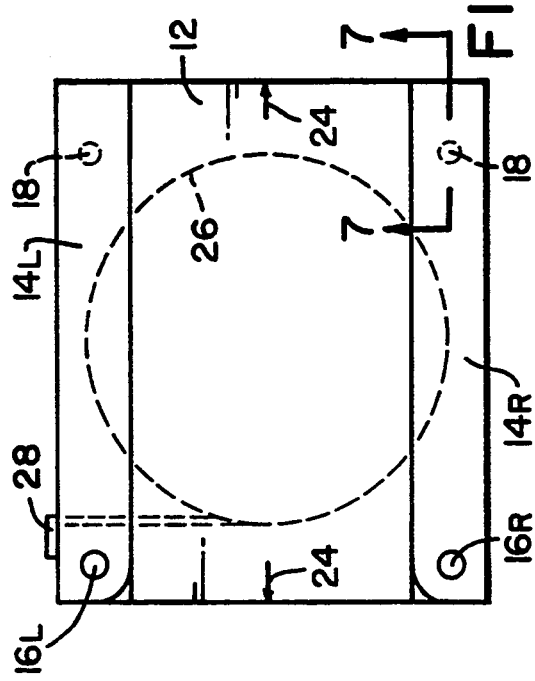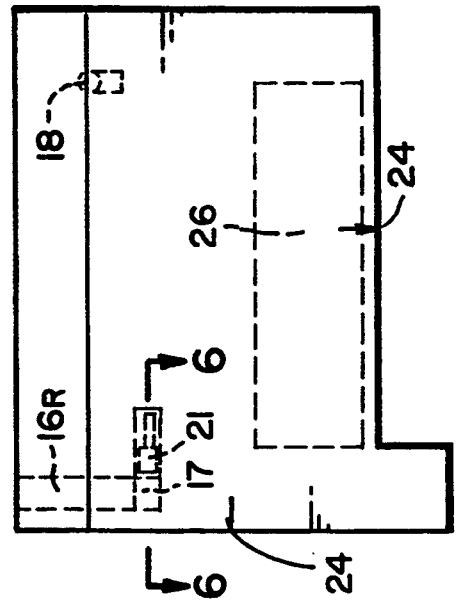

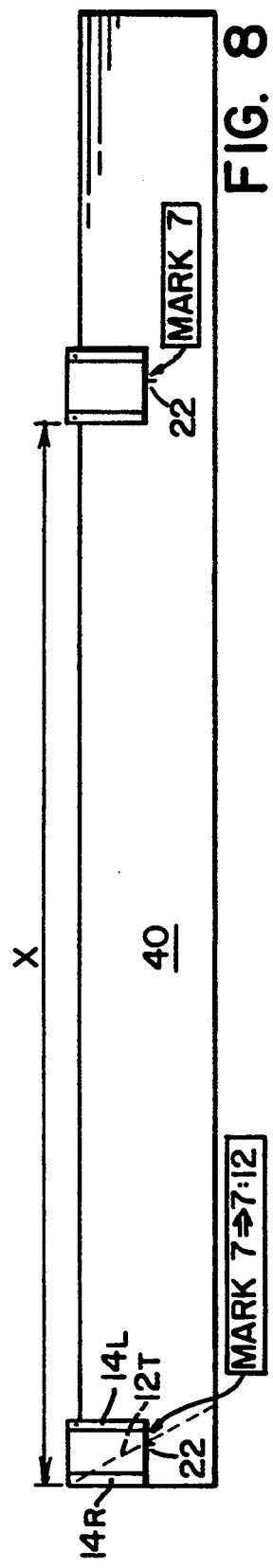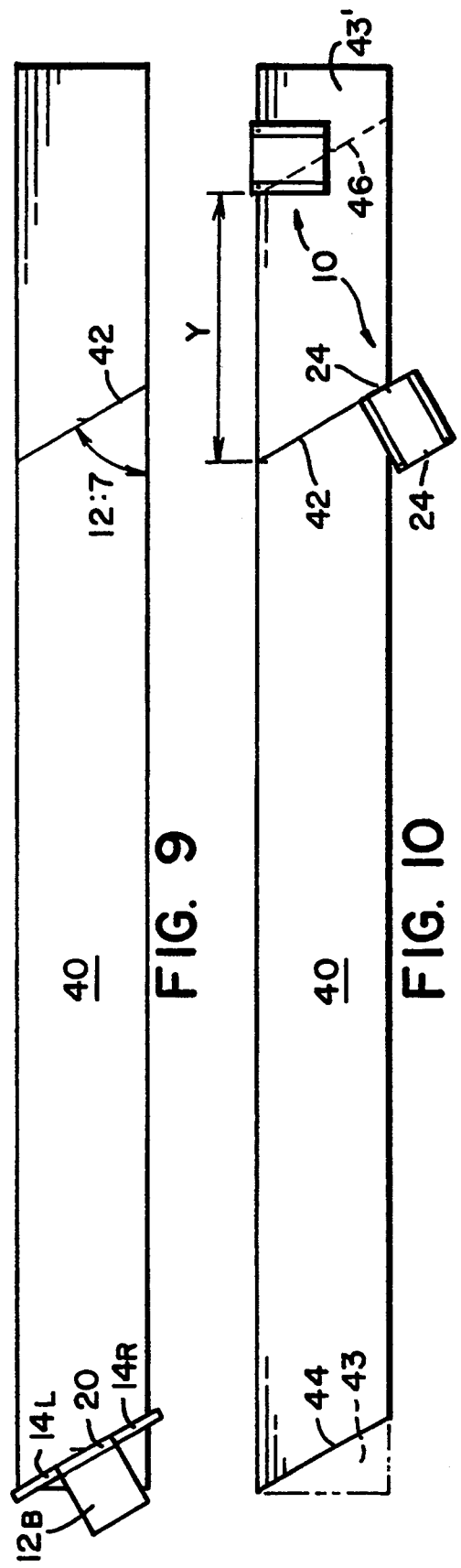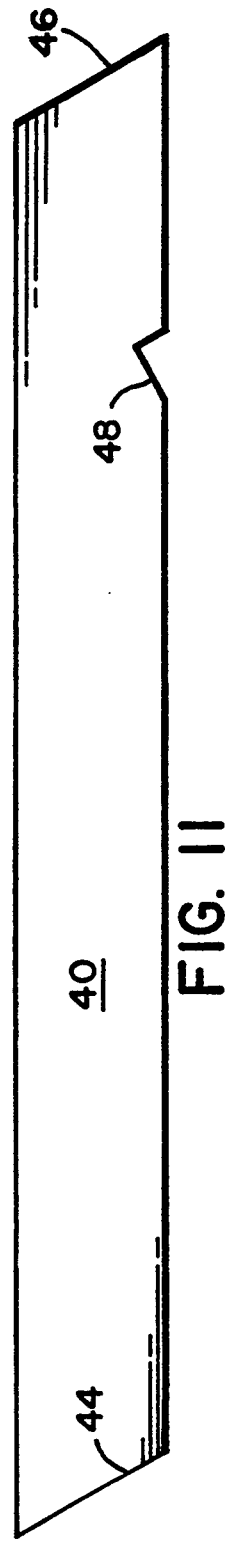

LAYOUT TOOL

BACKGROUND OF THE INVENTION

1. Field of the Invention

This invention relates, in general, to mensuration devices and, in particular, to layout tools which incorporate some measurement facility such as a foldable and/or extensible-retractable measuring tape. Of paramount importance in the instant combination is the novel T-square which serves as a highly utilitarian builder's layout tool.

2. Discussion of Relevant Art

Many layout, leveling, measuring and squaring tools have, over the years, incorporated adjunct tools such as plumb bobs, protractors, bubble levels, squaring devices and extensible-retractable tapes. Many invariably use index lines or indices, lubber lines or other forms of indicia for effecting linear and angular measurements.

A combination tool is disclosed by Ford in 1961 as U.S. Pat. No. 3,008,238; it teaches a compact square, level and steel tape combination tool. The Ford tool is a rectangular cased extensible-retractable tape measure which has a fold out edge that provides a flange means enabling the tape case-with-flange to be used as a squaring device. The compactness of this device, in that the square arms or members cannot be extended, limits the Ford tool. In 1968, Andrews was issued U.S. Pat. No. 3,364,581 for a dual squaring tool. Andrews teaches a grooved ruler which has mounted thereon, in slidable registry, a squaring head from which extends a concavo-convex tape measure, which when extended forms a stiff, rectilinear rule. The dual square head of the Andrews device is obliquely angled giving the device a facility to act as a surface gage.

Like the foregoing Andrew's tool, that disclosed by Showers in 1971 as U.S. Pat. No. 3,568,322 reveals an essentially flat, rectangular case containing an extensible-retractable tape measure, a plumb bob on an extensible-retractable line, a pivotal scriber arm and a non-pivotal fixed, transverse bar used for creating a straight edge reference. Like the aforementioned patents, that issued to Showers reveals a device that combines several tools, and a large number of parts and appears to require a great deal of dexterity and consummate skill in its application. A less complicated square level measuring tool is disclosed in U.S. Pat. No. 4,700,489, issued to Vasile in 1987. This tool is essentially a plane block containing a superposed block which includes a few bubble devices for leveling, an extensible-retractable tape and an extending, fixable and stiff metal rule. The protruding metal rule, used as the squaring arm, detracts from the compactness of the Vasile tool. Compactness also appears to be the disadvantage of a squaring tape measure case that is disclosed in U.S. Pat. No. 4,965,944 issued in 1992 to Kuze et al. Kuze et al. teach a measuring rule employing a casing which permits marking of lines perpendicular to an edge of a workpiece. It also serves to enable measurement and marking of lines through several angular measurements relative to other reference lines. The case of Kuze et al. is characterized by a compact, tape enclosure having two straight edges at right angles and an arcuate edge completing the case enclosure from the ends of the straight, perpendicular edges. On one of the straight edges, there are short extension flanges which, from a top plane view of the case, appears to form a stylized T, having a thick broad upright and very short, narrow and oppositely extending arms. The T-forming flanges enable a right angle scribing. The arms of the T shape are fixed and do not provide a great enough length to serve as a straight edge as one might find in any of the foregoing square or rigid rule type devices.

In order to overcome the limitations and disadvantages of earlier relevant art, I developed my combination layout tool over several iterations in order to ensure the combination of a compact layout tool, with extensible-retractable measuring facility, that would serve primarily as a carpenters square, but of a T shape. The latter is more often a tool of choice used by designers and draftsman, rather than carpenters or builders in general. In this respect, my invention, although adapted for layout usage, employs a somewhat unorthodox shape and method of application.

SUMMARY OF THE INVENTION

In order to avoid a combination of awkwardly contrived appendages, I have developed a tool which combines three of the carpenter's most useful tools used for laying out roof rafters or beams, mantels, lintels (including jamb studs) and wall board. These tools comprise the angular measurement device, a rule, a square and a straight edge of a length sufficient to scribe rake cuts on building studs and planks up to about 4"×10".

A conventional extensible-retractable metal tape is enclosed in a case generally described as a hexahedronic housing which consists of six faces: a front, a rear, a top, a bottom, and a left side face and right side face, referred to as right face or right side and left face or left side, respectively. The perfect hexahedronic geometry is varied somewhat by an extension of the rear face that depends a short distance below the bottom face. There is enclosed, in the overall general hexahedronic shape, arm like portions which are enclosed in the top left and top right edges and which are pivotally mounted proximate the rear of the case. These arms each pivotally swing outward from the case proper to form, at 90° pivotal extremes, a T shaped device such that the extended arms, in-line with the rear face, form a straight edge that defines the cross bar of a T silhouette. Perpendicular to the straight edge-cross bar is the case proper, which forms the upright of the T silhouette.

The aforementioned tape and case (with swingout arms) form the ruler, straight edge and square tools of my novel combination layout tool. The remaining facets, those which give the tool its layout capability are the special indices that I have provided along certain edges of the case. The first of these indices is a face center index. In my preferred embodiment, at each of several faces on the case having a linear dimension of precisely three inches, there is placed a center index at an edge of the face intersection with another of the six faces of the case. A second set of index markings, which I term pitch indices, is a visible division of the front face, bottom edge into 12 equal units. These index marks, in conjunction with the top left and right rear corners, as well as the top left and right bottom corners form a correspondence set of ratios which allow the establishment of pitch ratios ranging from 1:12 to 12:12, for the purposes of laying out angular patterns on the earlier mentioned building and construction materials. The center face indices, in conjunction with diametrically opposite corners of the case, are used in similar fashion for other stylized layouts, notably those having a precise one and one half inch measurement. After a brief description of the drawings, I shall set forth in detail the functional aspects of my invention, as well as offer to the reader an example of how it may be used to layout, for later cutting, a rafter to be used in a roof having a predetermined pitch and involving one of the more complicated layouts termed a "birdsmouth" notching.

BRIEF DESCRIPTION OF THE DRAWINGS

Of the Drawings:

FIG. 2 is a top plan of the case;

FIG. 3 is a front elevation of the case;

FIG. 4 is a right side or face elevation of the case;

FIG. 5 is a rear elevation of the case;

FIG. 6 is a sectional detail taken at 6—6 of FIG. 4;

FIG. 7 is a sectional detail taken at 7—7 of FIG. 2; and

FIGS. 8-11 detail the sequence for laying out a roof rafter in order to make rake cuts at the ridge intersection and at the eave end, with a birdsmouth notching for support wall integration.

DETAILED DESCRIPTION OF THE PREFERRED EMBODIMENT

Figure 1:
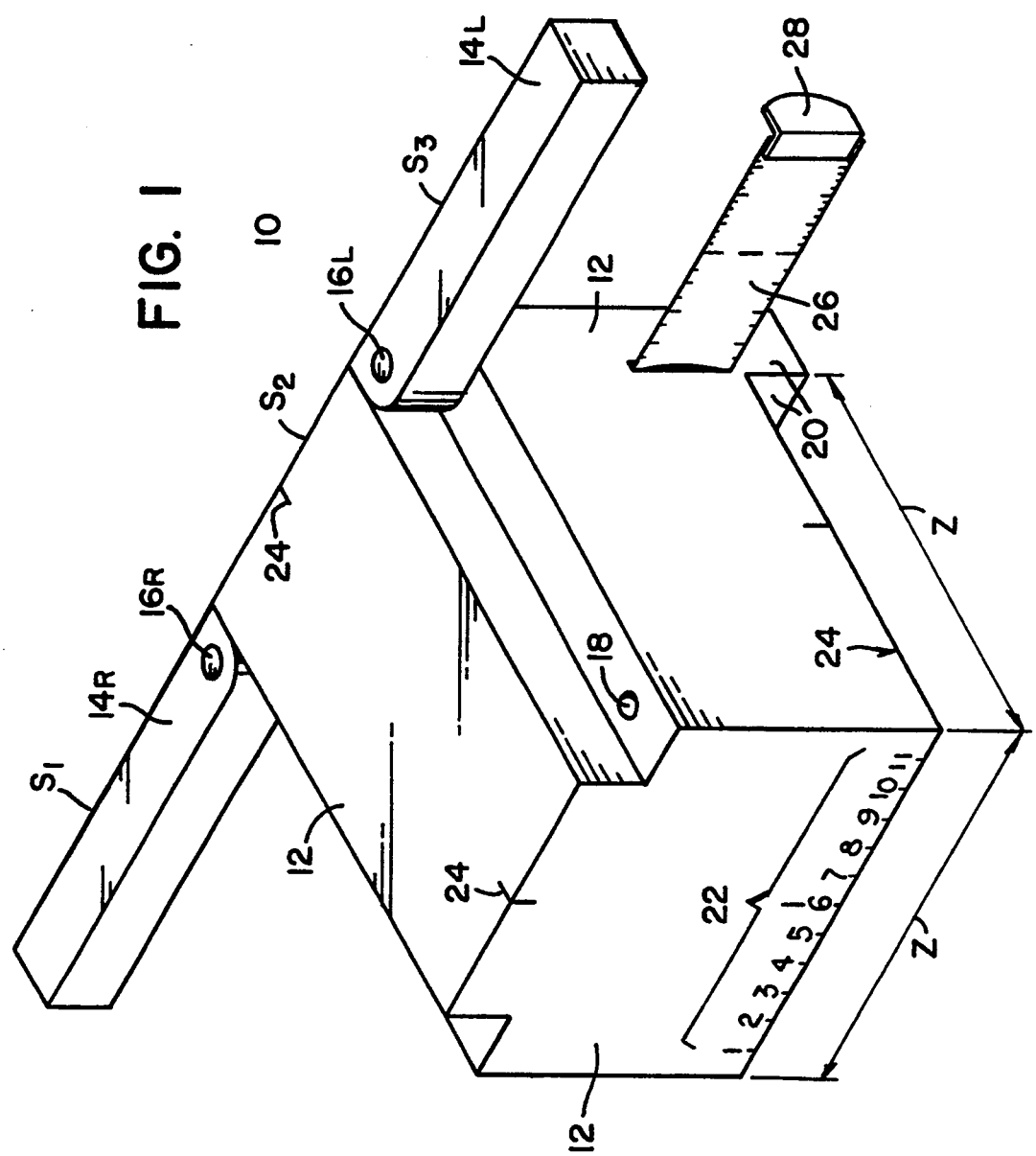
FIG. 1 is an isometric view of my invention.

Referring now to the appended drawings, I have illustrated the preferred embodiment of my invention which comprises a tape measure within a case that exemplifies a unique layout tool, including an integral T-square.

Specifically, in FIG. 1, there is shown an isometric view of the instant invention 10. A case 12 which houses an extensible-retractable tape measure (not shown) is of a hexahedronic shape essentially, including therein two independently formed, essentially hexahedronic arms 14R, 14L which are integrable within the case's generally hexahedronic shape. The exception to the pure geometric form being a depending flange 20, hereinafter described in greater detail with the other incidents of the invention. The aforesaid arms 14R, 14L are mounted to fixed shafts 16R, 16L, respectively, and are pivotally mounted within the case 12 proximate the rear-most face, obscured in FIG. 1. The pivotally moveable arms are shown in an extreme, extended position, orthogonal to the case 12 proper. It may be readily seen that, with the aforesaid arms in this extended mode, a T square is formed by the extended arms and the case, while a continuous straight edge is presented by a coextensive edge $S_1$ of the right arm 14R, the case edge $S_2$ and the edge $S_3$ of the left arm 14L. When the arms are folded inward toward the case, they are held in place by ball-in-socket locks 18. In this embodiment, the internally housed tape measure 26 is withdrawn from the left side of the case by grasping tab 28. The remaining details of the figure consist in a series of index markings. The most prominent of these markings are what I term hashmarks 22 on the front face of the case 12. The 11 hashmarks serve to partition the front face into 12 equal portions along the bottom front edge. The hashmarks are numbered from 1-11 and represent the ratios of 1:Z through 12:Z in respect of the same sequence in pitches (i.e. tangents) of 1:12 through 12:12, respectively. In my preferred embodiment, in order to establish the proper relationship with the length of 12, my Z dimension is precisely three inches, and it follows that the divisions 22 are precisely one quarter inch each. During the discussion of FIGS. 8-11, the reader will gain a greater appreciation for this particular design and case indexing. The remaining set of indices are what I term center face indices 24 which are embodied as center edge markings (although in actual practice they may constitute center face lineations) and are seen demarcating the center of all edges that are three inches in length.

FIGS. 2-7 illustrate, in more detail the various incidents of my invention and, since they have been briefly described in the section preceding this detailed discussion, I will only digress to point out details which were not readily discernable in FIG. 1. The top plan of FIG. 2 shows the left and right arms 14L, 14R in the "home" position. When secured by locks 18 as illustrated, the top face is complete and has, according to the FIG. 2 illustration, dimensions of three inches precisely at left and right edges and three and one half inches in length (i.e. the length of the arms). Also newly indicated in FIG. 2 is the position of the extensible-retractable tape 26, shown in phantom. FIG. 3, a frontal elevation, shows the front face to be two and one half inches high, and therefore not provided at the left and right edges with face center indices. The top and bottom edges, however, reflect a center face index 24 at the top as well as combination center face index 24 and pitch index or hashmark 22 for the 6:12 pitch reference. Thus, in my preferred embodiment, the top and bottom edges of the front face are three inches wide. Seen depending downwardly is the rear face extension 20 for which I prefer dimensions of one half inch by one half inch. Thus, the reader may anticipate that, since the rear face is obviously three inches square, four center face edge marks 24 will appear thereon. (A quick reference to FIG. 5 confirms this fact). Also shown in FIG. 3 are the right and left arms 14R, 14L, the shafts to which they are mounted 16R, 16L (in phantom) and the locking balls 18 disposed in arm-receiving rabbeted edges that I term "home" locations. Incidents of the shafts not seen in FIG. 3 are presented in FIG. 4. This right side (or face) elevation discloses a flat 17 on the bottom portion of the fixed shaft 16R of right arm 14R. With the arm 14R in its "home" position, the flat 17 faces away from the reader, 90° away from the spring-biased detent 21. When the arm 14R is rotated outward to form a 90° projection from the case 12, the flat 17 will be engaged by detent 21 so that the arm is retained in the fully (90°) extended mode. The same holds for the left arm ( not shown ). This flat-contacting detent facility is shown in greater detail at FIG. 6. FIG. 5 is otherwise unremarkable, showing a three inch by three inch rear face of the case and the center face indices 24 marked thereon. FIG. 6 is the sectional detail of FIG. 4 taken at 6—6 and shows the reader a top view of the left arm (in phantom) to present its relationship of shaft 16L flat 17 to spring-biased detent 21. Final to this series of drawings, FIG. 7 is a sectional detail of the arm locking ball 18 taken at 7—7 of FIG. 2. Therein, right arm 14R is shown in the home position being retained by spring 19-biased ball 18 in its case 12-disposed position.

In FIGS. 8-11, I will set forth an example, for the reader, of one way in which I propose that this invention be employed. I choose to layout and cut a rafter, say a plank of nominal two by six dimension which will be rake cut at one end to provide (or mate to) a ridge peak, and at the other end a plumb edge for the acceptance thereon of drip edge and/or facia. I will also demonstrate the technique for layout and cutting of the birdsmouth notch which accepts and rests atop the upper plate of an exterior support wall. First, as shown in FIG. 8, my invention is placed at the left hand side of a suitable rafter candidate, the end having been previously cut square or herenow squared and cut for subsequent dressing. The top face 12T is presented upward toward the reader and the case is presented on the board 40, squared as shown, with its right side to the left of the figure and the flange 20 conterminous with the top edge of the board. The tape measure is extended and the distance X is scribed toward the right side of the board. This distance X represents the distance chosen from the ridge peak to the outside wall edge plane. Thus, the right sides 14R of the case 12T represent the points or references at the top of the board 40 where the two rake cuts will be made for the ridge and eave cuts, respectively. A mark is made at the hashmark 22 (here mark 7 to layout 7:12 pitch). The proper rake cuts will allow us to achieve the desired roof pitch for which this rafter and subsequent ones will be cut. In the second step of this procedure, also shown in FIG. 8, the right-most position of the case, at distance X is used to scribe or mark the same hashmark (mark 7) as previously done at the left side of the board. FIG. 9 shows how the scribe marks 42 are made at both the right hand side and the left hand side of the board 40. The reader will note that the angle shown between the scribe line 42 and the bottom edge of the board 40 has a ratio of 12:7, the inverse of which is a ratio of 7:12, the desired roof pitch that we have set out to create. The illustration at the left hand side of FIG. 9 shows the invention 10 inverted with the bottom face 12B facing the reader. In this position, the extended arms form the straight edge (with the rear face edge) that was illustrated in FIG. 1. Thus, the second line 44 is scribed and the first cut 43 is made as shown in FIG. 10. As is seen in FIG. 10, no cut is made at the first-scribed line 42. Instead, a further distance Y is measured off and the case right face placed at that reference point. The distance Y corresponds to the desired overhang that will be used for this construction. In the manner of scribing line 42, line 46 is now marked off and cut 43' as shown in FIG. 10. Those of ordinary skill will understand that cuts need not be made in the sequence mentioned, but may be reserved as the final step after all layouts have been completed. The last layout, and one to which my invention marvelously lends itself, is that of the birdsmouth notch, a "seating" cut which allows the rafter to rest on the top plate of an outside weight-bearing wall so that the desired pitch is retained, yet the top plate of the wall is wholly covered by the rafter which appears to terminate precisely at the inside edge of the wall's top plate. This allows wall board or wall covering to terminate precisely and cleanly at a straight line as it intersects ceiling covering. After the eave edge line 46 is scribed, the tool is placed along line 42 as shown, so that the top faces the reader (user), the front face is conterminous with line 42, the center face index 24 is at the intersection of scribed line 42 and the bottom of board 40 while the left face of the case presents a straight edge for the scribing of line 48 (shown in FIG. 11). Thus, as shown in FIG. 11, rake cuts at lines 44 and 46, as well as partial cuts at the same angular measurement (12:7) on the birdsmouth layout 48, along with the completed top plate cut at 48, ensure that, when the board 40 is positioned properly as a rafter, lines 44, 46 and the right hand portion of 48 will be plumb (vertical), while the left side of 48 will lay on the support wall top plate, perfectly horizontal, and the thus positioned rafter will have a slope (pitch) of 7:12.

Those familiar with the technique of layout work such as that necessary for engagement in the building trades will readily understand the use of my invention. Although it is beyond the scope of this disclosure to go into every possible instance wherein it may be used, it is my intent to produce written instructions, and many more specific examples such as that given above with each model of my prospective product. Those having recourse to this invention are commended its usage; the making, using and selling of my invention being restricted only by the hereinafter appended claims.

What is claimed is:

1. A combination layout tool which includes a builder's T-square having an integral extensible-retractable tape and which comprises:

a hexahedronic case for housing a conventional, flexible measuring tape that extends thereoutof and retracts thereinto, said case defined by six faces: a front, a rear, a top, a bottom, a left and a right, said case further defined by a rear face extension that depends downwardly from and is conterminous with an edge common to the rear and bottom faces, said case further comprising two generally hexahedronic arms in pivotal disposition within and forming edge portions of said case and specifically disposed each at an intersection of the top face with the right and with the left faces, said two arms pivotally swingable toward the rear face on rearwardly mounted shafts and securable at 90° outward pivot positions to cooperatively form, with an edge common to said top and said rear faces, a continuous straight edge.

2. The layout tool of claim 1 further comprising at least one central face index marking that is disposed along at least one edge which is common to two of the said faces.

3. The layout tool of claim 2 further comprising at least one set of indices for ascertaining layout angular parameters on a workpiece, said set disposed along an edge common to said front and said bottom faces of said case.

4. The layout tool of claim 3 wherein said tape is extensible from one of said left and right faces of said case.

5. A builder's layout tool comprising:

a hexahedronic case for housing a conventional, flexible measuring tape that extends thereoutof and retracts thereinto, said case defined by six plane faces including a front, a rear, a top, a bottom, a left and a right face, said case further defined by a rear face extension that depends downwardly from the intersection of said bottom and said rear faces, said case further comprising first and second generally hexahedronic arms in a pivotal disposition within and forming substantial edge portions of the case at each of two face intersections, said arms fixed to a respective shaft that is disposed proximate the rear face, a first of said two intersections being the top face with the left face and a second of said intersections being the top face with the right face, said first and said second arms pivotally swingable, from out said pivotal disposition, arcuately in a direction toward the rear face and securable at extreme outward pivotal positions to form a T shape wherein the arms and rear face of said tool form a continuous straight edge which is orthogonal to the case.

6. The layout tool of claim 5 further comprising a center-of-face marking that is disposed along at least one edge which is common to two of the said faces.

7. The layout tool of claim 6 further comprising a set of indicia used to ascertain layout angular parameters on a workpiece, said set disposed along an edge common to said front and said bottom faces of said case.

8. The layout tool of claim 7 wherein said tape is extensible from one of said left and right faces proximate the rear face, of said case.

9. The layout tool of claim 7 wherein said first and said second arms are rearwardly fixed on, and pivotally hinged by, essentially cylindrical shafts, each said shaft containing a flat which is facially contacted by a spring-biased, orthogonally disposed detent within said case when each said arm of said shaft is fully at an extreme outward pivotal position.

10. A combination T square tool measuring tape comprising:
   a case which houses an extensible-retractable tape measure of conventional type, said case being essentially a hexahedronic shape with front, rear, top, bottom, left and right faces, said rear face contiguous to a flange that extends therefrom and beyond said bottom face, said case further containing therein at least one spring-biased detent;
   two securable and pivotally moveable arms, a left and a right, that are enclosed in a home position within said hexahedronic shape and pivot on left and right rearwardly disposed cylindrical shafts to which said arms are respectively fixed, said shafts each further disposed proximate left, top and rear face and proximate right, top and rear face intersections, respectively, so that when said left and said right arms are pivoted away from said home position, each to a 90° extension, an outer surface of each said arm forms, with the rear face, a continuous straight edge, while both arms so extended form with the case, a T square.

11. The tool of claim 10 wherein each said cylindrical shaft includes a flat on a curved surface thereof, so that when an arm is in a fully extended position, each said flat presents a plane surface for snubbing contact with said at least one spring-biased detent.

12. The tool of claim 11 wherein said tape measure extends from and retracts into a side face of the case proximate the rear face.

* * * * *